US012793689B2

(12) United States Patent
Suzuki et al.

(10) Patent No.: US 12,793,689 B2
(45) Date of Patent: Nov. 10, 2026

(54) NOISE CANCELLING SYSTEM

(71) Applicant: LG Display Co., Ltd., Seoul (KR)

(72) Inventors: Takayuki Suzuki, Kanagawa (JP); Shinji Takasugi, Kanagawa (JP); Tsutomu Ichikawa, Kanagawa (JP)

(73) Assignee: LG Display Co., Ltd., Seoul (KR)

( * ) Notice: Subject to any disclaimer, the term of this patent is extended or adjusted under 35 U.S.C. 154(b) by 135 days.

(21) Appl. No.: 18/965,678

(22) Filed: Dec. 2, 2024

(65) Prior Publication Data

US 2025/0210027 A1 Jun. 26, 2025

(30) Foreign Application Priority Data

Dec. 22, 2023 (JP) ................................ 2023-216421

(51) Int. Cl.
*G10K 11/178* (2006.01)

(52) U.S. Cl.
CPC .................. *G10K 11/17825* (2018.01); *G10K 11/17823* (2018.01); *G10K 11/17881* (2018.01);

(Continued)

(58) Field of Classification Search
CPC ........... G10K 11/17825; G10K 11/178; G10K 11/17823; G10K 11/17331; G10K 11/17817; G10K 11/17819; G10K 11/17827; G10K 11/17853; G10K 11/17854; G10K 11/17855; G10K 11/17881; G10K 11/17885; G10K 11/17813; G10K 2210/3011; G10K 2210/3026; G10K 2210/3027; G10K 2210/3028; G10K 2210/1081;

(Continued)

(56) References Cited

U.S. PATENT DOCUMENTS 6,278,786 B1 * 8/2001 McIntosh ......... G10K 11/17857 381/71.13
2002/0003887 A1 * 1/2002 Zhang .............. G10K 11/17817 381/71.8
2003/0228019 A1 * 12/2003 Eichler ................ H04R 1/1083 381/71.8

(Continued)

FOREIGN PATENT DOCUMENTS

| | | | |
|---|---|---|---|
| JP | 2013-238870 | A | 11/2013 |
| KR | 10-2008-0043237 | A | 5/2008 |
| KR | 10-1758708 | B1 | 7/2017 |
| KR | 10-2023-0145151 | A | 10/2023 |

*Primary Examiner* — Leshui Zhang

(74) *Attorney, Agent, or Firm* — Seed Intellectual Property Law Group LLP

(57) ABSTRACT

A noise cancelling system including: an input unit outputting a noise signal corresponding to an external noise; a digital unit including an analog to digital converting circuit converting the noise signal into a digital signal, a digital filter circuit filtering the digital signal and a digital to analog converting circuit converting the digital signal filtered into a first noise cancel signal of an analog type; an analog unit outputting a second noise cancel signal obtained by filtering the noise signal; an adder outputting a third noise cancel signal obtained by adding the first noise cancel signal and the second noise cancel signal; an output unit outputting an output signal obtained by adding the third noise cancel signal to a sound signal of a sound source; and a feedback unit outputting a control signal based on the first noise cancel signal and the second noise cancel signal to the analog unit.

20 Claims, 7 Drawing Sheets

(52) U.S. Cl.
CPC ................ *G10K 2210/3011* (2013.01); *G10K 2210/3026* (2013.01); *G10K 2210/3027* (2013.01); *G10K 2210/3028* (2013.01)

(58) Field of Classification Search
CPC ...... G10K 2210/3023; G10K 2210/509; G10L 21/0208; H04R 1/1083; H04R 3/00; H04R 3/02; H04R 3/002; H04R 3/005; H04R 3/14; H04R 25/453; H04R 25/356; H04B 3/23; H03H 15/00; H04M 9/082
USPC ....... 381/71.11, 71.8, 71.2, 71.1, 97, 95, 96, 381/98, 100, 101, 102, 103, 1, 4, 381/111–117, 120, 121, 122, 150, 151, 381/93, 94.3; 700/94
See application file for complete search history.

(56) References Cited

U.S. PATENT DOCUMENTS

| | | | | |
|---|---|---|---|---|
| 2004/0015348 | A1* | 1/2004 | McArthur | G10L 21/0208 704/226 |
| 2005/0053244 | A1* | 3/2005 | Onishi | G10K 11/17817 381/71.8 |
| 2007/0098119 | A1* | 5/2007 | Stothers | G10K 11/17855 375/345 |
| 2008/0107282 | A1* | 5/2008 | Asada | G10K 11/17817 381/71.14 |
| 2008/0112570 | A1* | 5/2008 | Asada | G10K 11/17855 381/71.11 |
| 2012/0183025 | A1* | 7/2012 | Manickam | H04L 25/03057 375/222 |
| 2023/0252969 | A1 | 8/2023 | Zhang et al. | |

* cited by examiner

NOISE CANCELLING SYSTEM

CROSS-REFERENCE TO RELATED APPLICATIONS

The present application claims the benefit and priority to Japanese Patent Application No. 2023-216421, filed in Japan on Dec. 22, 2023, the entirety of which is hereby incorporated by reference for all purposes into the present application.

TECHNICAL FIELD

The present disclosure relates to a noise cancelling system, and more particularly, to a noise cancelling system having a hybrid type.

DESCRIPTION OF THE RELATED ART

An active noise control (ANC) is a technology in which a sound is removed using a phase interference by generating a sound of an antiphase from a separately prepared control sound with respect to a sound for reduction. The ANC has been widely used for a function of a noise controller or a noise canceller of an earphone or a headphone.

For example, in Japanese Patent Publication No. 2013-238870, a hybrid type noise cancelling system where a band of a noise reduction and a level of a noise reduction complement each other due to a noise cancel signal formed in a digital unit and a noise cancel signal formed in an analog path is disclosed.

In the hybrid type noise cancelling system, since properties of an analog signal processing and a digital signal processing are greatly different from each other, an effect of a noise cancelling is reduced.

BRIEF SUMMARY

Accordingly, the present disclosure is directed to a noise cancelling system that substantially obviates one or more of the issues due to limitations and disadvantages of the related art.

Therefore, the inventors of the present disclosure recognized the problems mentioned above and other limitations associated with the related art, and conducted various experiments to implement a display device in which the gate signal is sufficiently supplied to a subpixel.

An object of the present disclosure is to provide a noise cancelling system where an effect of a noise cancelling is improved.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other aspects of the inventive concepts and in accordance with the purpose of the present disclosure, as embodied and broadly described herein, a noise cancelling system including: an input unit that outputs a noise signal corresponding to an external noise; a digital unit including an analog to digital converting circuit that converts the noise signal into a digital signal, a digital filter circuit that filters the digital signal, and a digital to analog converting circuit that converts the digital signal filtered by the digital filter circuit into a first noise cancel signal of an analog type; an analog unit that outputs a second noise cancel signal obtained by filtering the noise signal; an adder that outputs a third noise cancel signal obtained by adding the first noise cancel signal and the second noise cancel signal; an output unit that outputs an output signal obtained by adding the third noise cancel signal to a sound signal of a sound source; and a feedback unit that outputs a control signal based on the first noise cancel signal and the second noise cancel signal to the analog unit.

In another aspect, a method of driving a noise cancelling system including an input unit that outputs a noise signal corresponding to an external noise, a digital unit including an analog to digital converting circuit that converts the noise signal into a digital signal, a digital filter circuit that filters the digital signal, and a digital to analog converting circuit that converts the digital signal filtered by the digital filter circuit into a first noise cancel signal of an analog type, and an analog unit that outputs a second noise cancel signal obtained by filtering the noise signal includes: outputting a third noise cancel signal obtained by adding the first noise cancel signal and the second noise cancel signal; outputting an output signal obtained by adding the third noise cancel signal to a sound signal of a sound source; and outputting a control signal based on the first noise cancel signal and the second noise cancel signal to the analog unit.

It is to be understood that both the foregoing general description and the following detailed description are explanatory and are intended to provide further explanation of the disclosure as claimed.

BRIEF DESCRIPTION OF THE SEVERAL VIEWS OF THE DRAWINGS

The accompanying drawings, which may be included to provide a further understanding of the disclosure and are incorporated in and constitute a part of this specification, illustrate embodiments of the disclosure and together with the description serve to explain various principles of the disclosure. In the drawings.

Figure 1:
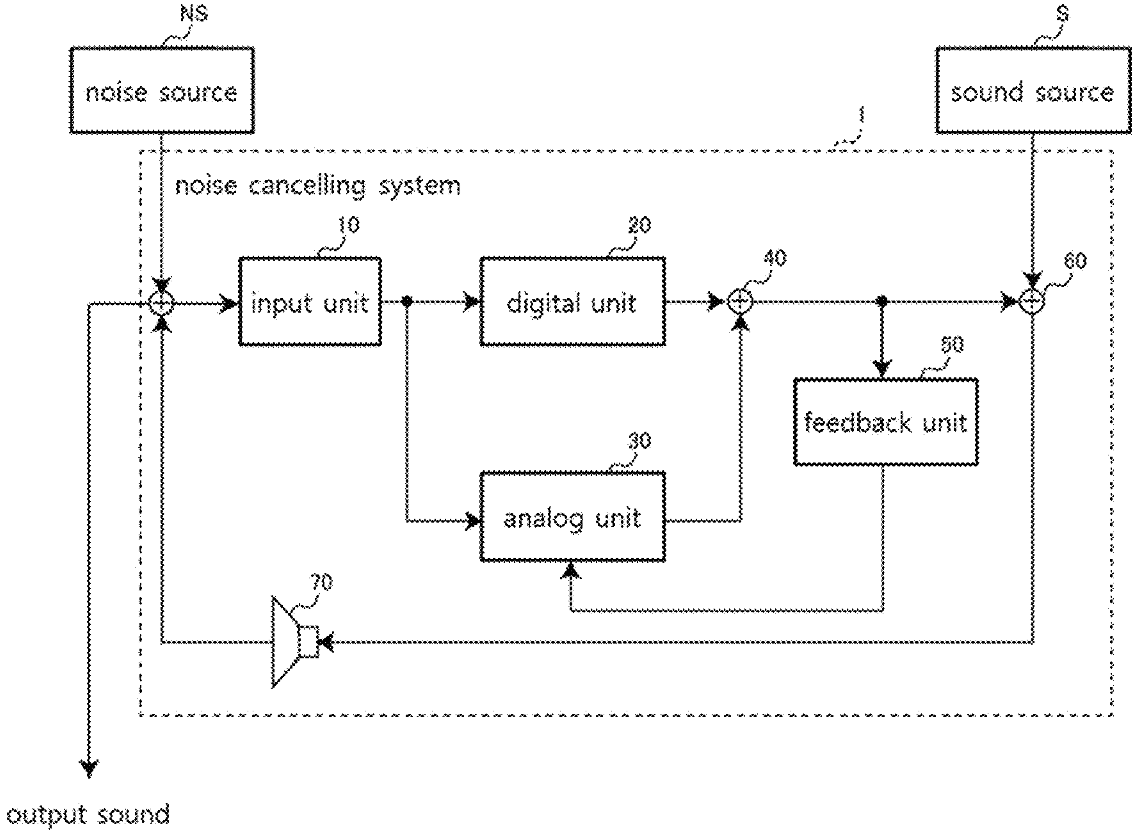
FIG. 1 is a view showing a noise cancelling system according to a first embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example embodiments of the present disclosure are merely given by way of example. Therefore, the present disclosure is not limited to the illustrations in the drawings.

Where the terms "comprise," "have," "include" and the like are used, one or more other elements may be added unless the terms, such as "only," is used. An element described in the singular form is intended to include plurality of elements, and vice versa, unless the context clearly indicates otherwise. Any implementation described herein as an "example" is not necessarily to be construed as preferred or advantageous over other implementations.

In construing an element, the element is construed as including an error range or tolerance range although there is no explicit description of such an error or tolerance range.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

Where positional relationships are described, for example, where the positional relationship between two parts is described using "on," "over," "under," "above," "below," "beneath," "near," "close to," or "adjacent to," "beside," "next to," or the like, one or more other parts may be disposed between the two parts unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "left," "right," "top," "bottom, "downward," "upward," "upper," "lower," and the like refer to an arbitrary frame of reference.

In describing elements of the present disclosure, the terms like "first," "second," "A," "B," "(a)," and "(b)" may be used. These terms may be merely for differentiating one element from another element, and the essence, sequence, order, or number of the corresponding elements should not be limited by these terms. Also, when an element or layer is described as being "connected," "coupled," or "adhered" to another element or layer, the element or layer can not only be directly connected, or adhered to that other element or layer, but also be indirectly connected, or adhered to that other another element or layer with one or more intervening elements or layers "disposed" between the elements or layers, unless otherwise specified.

Where an element or layer is referred to as being "on" or "connected to" another element or layer, it should be understood to mean that the element or layer may be directly on or directly connected to the other element or layer, or that intervening elements or layers may be present. Also, where one element is referred to as being disposed "on" or "under" another element, it should be understood to mean that the elements may be so disposed to directly contact each other, or may be so disposed without directly contacting each other.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, embodiments of the present disclosure will be described in detail with reference to the accompanying drawings. Further, all the components of each display device according to all embodiments of the present disclosure are operatively coupled and configured FIG. 1 is a view showing a noise cancelling system according to a first embodiment of the present disclosure.

In FIG. 1, a noise cancelling system 1 according to a first embodiment of the present disclosure has a feedback type. The feedback type is a control method where a real situation is obtained in real time and a control input is determined based on the real situation.

The noise cancelling system 1 performs a signal processing to a noise signal receiving an external noise of a noise source NS and generates a noise cancel signal removing the noise signal. The noise cancelling system 1 outputs an output sound which is obtained by adding the noise cancel signal and a sound signal such as a music inputted from a sound source S. The output sound outputted from the noise cancelling system 1 and the external noise generated by the noise source NS are inputted to an ear channel of a user. Since the external noise is removed due to the noise cancel signal of the output sound, the user may hear only a sound based on the sound signal inputted from the sound source S.

The noise cancelling system 1 includes an input unit 10, a digital unit 20, an analog unit 30, a first adder 40, a feedback unit 50, a second adder 60 and an output unit 70.

The input unit 10 includes a microphone and a microphone amplifier to receive the external noise and the sound generated by the output unit 70. The input unit 10 outputs the sound received by the microphone as the noise signal. In a feedback method, the external noise is reduced through a feedback of an antiphase component (noise cancel signal) of the signal (noise signal) received by the input unit 10.

The digital unit 20 sequentially performs an analog to digital (A/D) conversion, a digital filtering and a digital to analog (D/A) conversion and generates a first noise cancel signal reducing the external noise.

Figure 2:
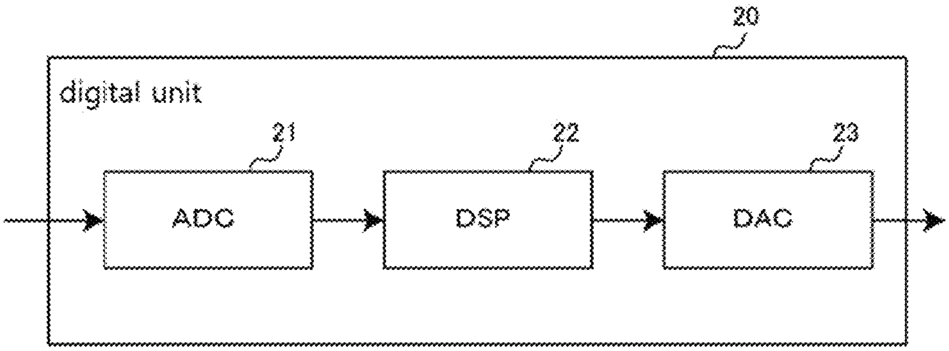
FIG. 2 is a view showing a digital unit of a noise cancelling system according to a first embodiment of the present disclosure.

FIG. 2 is a view showing a digital unit of a noise cancelling system according to a first embodiment of the present disclosure.

In FIG. 2, the digital unit 20 includes an analog to digital converter (ADC) 21, a digital signal processer (DSP) 22 and a digital to analog converter 23. The ADC 21 is an analog to digital (A/D) converting circuit converting the external noise signal into a digital signal. The DSP 22 as a kind of microprocessor is a digital filter circuit digital-filtering the digital signal converted in the ADC 21. The DAC 23 converts the digital signal digital-filtered in the DSP 22 into a first noise cancel signal of an analog signal.

The analog unit 30 is an analog circuit outputting a second noise cancel signal obtained by analog-filtering the noise signal.

Figure 3:
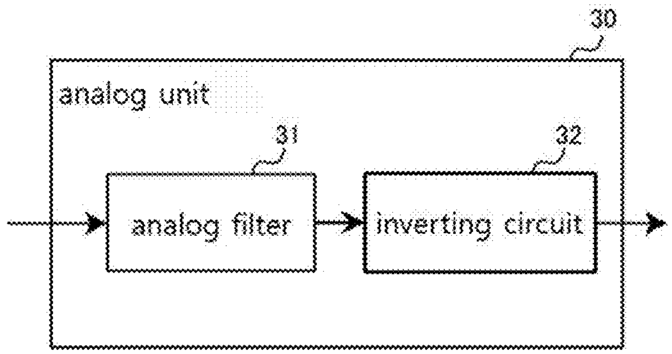
FIG. 3 is a view showing an analog unit of a noise cancelling system according to the first embodiment of the present disclosure.

FIG. 3 is a view showing an analog unit of a noise cancelling system according to a first embodiment of the present disclosure.

In FIG. 3, the analog unit 30 includes an analog filter 31 and an inverting circuit 32. The analog filter 31 analog-filters the noise signal of an analog signal. The inverting circuit 32 performs a phase inversion of the analog signal analog-filtered in the analog filter 31 to generate an second noise cancel signal.

A property of the analog filter (first analog filter) 31 is adjusted based on a control signal from the feedback unit 50. The analog filter 31 includes a resistive element, a capacitive element and an operational amplifier. At least one of a resistance value of the resistive element and a capacitance of the capacitive element is changed according to the control signal.

The analog filter 31 may include a low pass filter. A cutoff frequency of the low pass filter may be determined such that a noise cancelling effect is maximized. The cutoff frequency may be adjusted based on the control signal.

For example, the low pass filter may include a Bessel filter, a Chebyshev filter and a Butterworth filter. The Bessel filter as a kind of linear filter in electronics and signal processing is characterized by a group delay that is as flat as possible (linear phase response). The Bessel filter is widely used in a circuit dividing a high frequency and a low frequency. The Bessel filter is preferable to other filters in that the Bessel filter has the flattest group delay property. However, the Bessel filter is worst in terms of attenuation in a cutoff region. As a result, when the Bessel filter is used, it is required to properly adjust a relationship between the cutoff frequency and the group delay property.

For example, when the cutoff frequency of the low pass filter is improperly determined, a phase difference between the noise signal and the noise cancel signal corresponding to the noise signal is deviated from 180 degrees near the cutoff frequency, and both of the noise signal and the noise cancel signal become stronger. As a result, an increase of the noise signal may be triggered to generate a howling. Accordingly, the cutoff frequency may be determined as a relatively low value in the analog unit 30.

Figure 4:
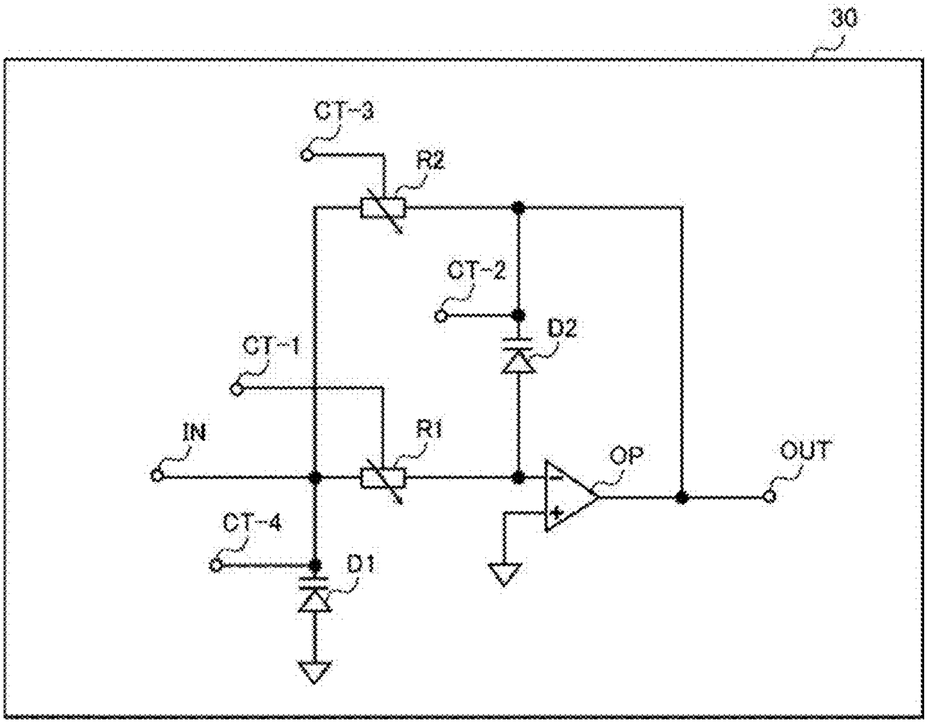
FIG. 4 is a view showing an exemplary analog unit of a noise cancelling system according to the first embodiment of the present disclosure.

FIG. 4 is a view showing an exemplary analog unit of a noise cancelling system according to a first embodiment of the present disclosure.

In FIG. 4, the analog unit 30 includes first and second resistive elements R1 and R2, first and second capacitive elements D1 and D2 and an operational amplifier OP. The first and second resistive elements R1 and R2, the first and second capacitive elements D1 and D2 and the operational amplifier OP constitute a low pass filter circuit of an inverting amplification type.

For example, the first and second resistive elements R1 and R2 may include a variable resistor such as a potentiometer, and a resistance value of the first and second resistive elements R1 and R2 may be changed according to first and third control signals CT-1 and CT-3.

The first and second capacitive elements D1 and D2 may include a variable capacitance diode, and a capacitance value of the first and second capacitive elements D1 and D2 may be changed according to second and fourth control signals CT-2 and CT-4.

The operational amplifier OP may include a non-inverting input terminal (+), an inverting input terminal (−) and an output terminal.

When the inputted noise signal IN is filtered through the first and second resistive elements R1 and R2, the first and second capacitive elements D1 and D2 and the operational amplifier OP, the second noise cancel signal is outputted. The resistance value of the first and second resistive elements R1 and R2 and the capacitance value of the first and second capacitive elements D1 and D2 may be changed according to the first to fourth control signals CT-1 to CT-4, and the cutoff frequency and the phase of the low pass filter may be changed according to the first to fourth control signals CT-1 to CT-4. A property such as a gain as well as the cutoff frequency and the phase may be changed according to the first to fourth control signals CT-1 to CT-4. The first to fourth control signals CT-1 to CT-4 may be the control signals supplied from feedback unit 50 or may be obtained by adding a bias voltage to the control signals supplied from feedback unit 50.

The first adder 40 generates a third noise cancel signal obtained by adding the first noise cancel signal and the second noise cancel signal. The third noise cancel signal is outputted to the feedback unit 50 and the second adder 60. The third noise cancel signal may be a sum of the first noise cancel signal and the second noise cancel signal.

The feedback unit 50 filters the third noise cancel signal inputted from the first adder 40 and supplies the control signal to the analog unit 30. The analog unit 30 may change properties such as the cutoff frequency, the phase and the gain of the low pass filter according to the control signal.

The second adder 60 generates an output signal obtained by adding the third noise cancel signal from the feedback unit 50 to the sound signal from the sound source S.

The output unit 70 includes a power amplifier, a driving circuit and a speaker. The output unit 70 drives the speaker using the output signal generated in the second adder 60. As a result, the external noise is removed in an ear of a user, and the user may receive only the sound without the external noise.

Figure 5A:
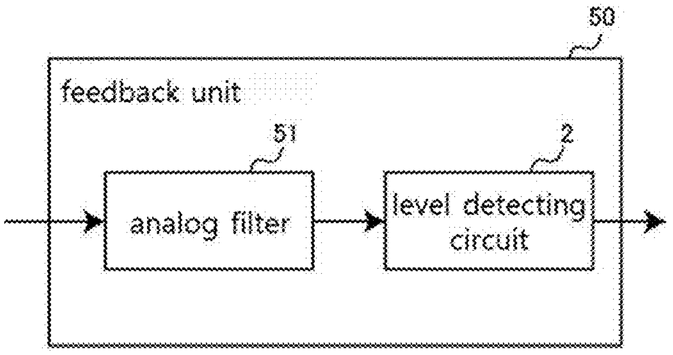
FIG. 5A is a view showing a feedback unit of a noise cancelling system according to the first embodiment of the present disclosure.
Figure 5B:
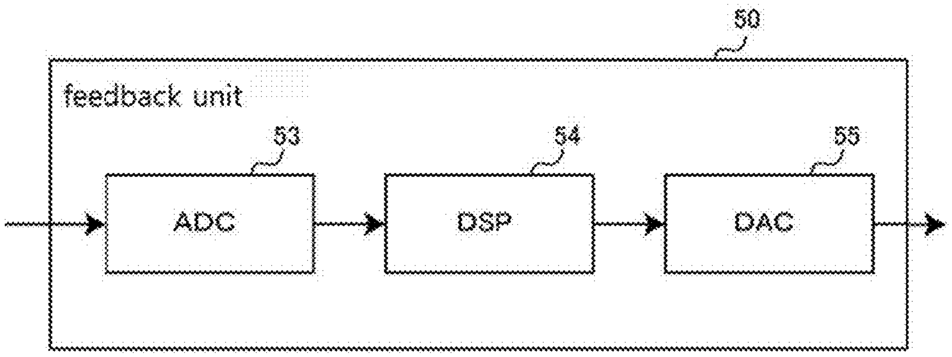
FIG. 5B is a view showing a feedback unit of a noise cancelling system according to a second embodiment of the present disclosure.
Figure 5C:
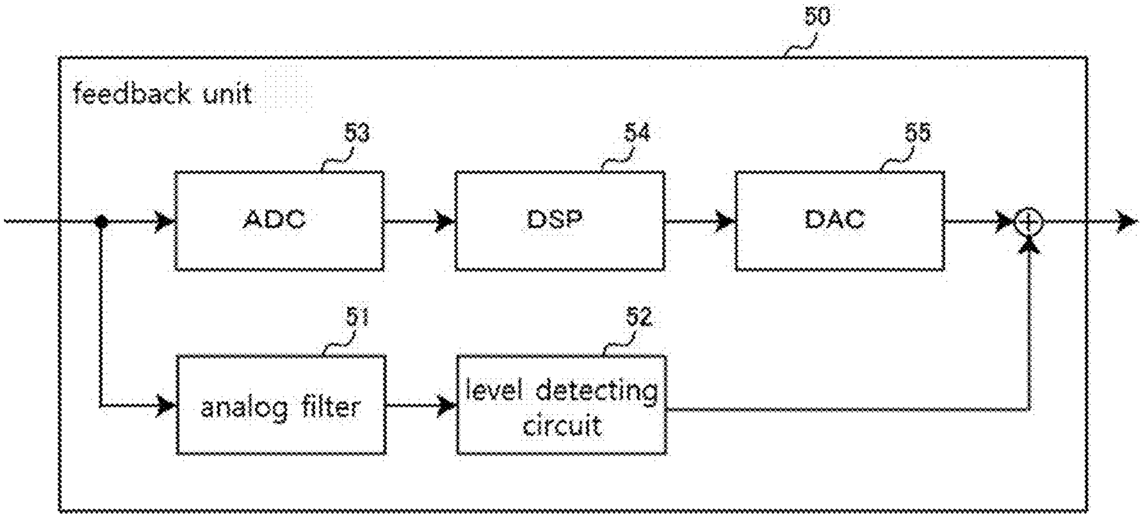
FIG. 5C is a view showing a feedback unit of a noise cancelling system according to a third embodiment of the present disclosure.

FIGS. 5A to 5C are views showing a feedback unit of a noise cancelling system according to a first embodiment, a second embodiment and a third embodiment, respectively, of the present disclosure. The feedback unit 50 is a circuit blocking a signal having a predetermined frequency component among the inputted signals. The feedback unit 50 may be constituted by various circuits such as an analog circuit, a digital circuit or a combination of an analog circuit and a digital circuit.

In FIG. 5A, the feedback unit 50 according to a first embodiment is constituted by an analog circuit including an analog filter 51 and a level detecting circuit 52.

The analog filter 51 is a second analog filter filtering the inputted third noise cancel signal. Similarly to the analog filter 31, the analog filter 51 may include a low pass filter.

The level detecting circuit 52 includes an integrating circuit. The level detecting circuit 52 detects a level of the analog signal outputted from the analog filter 51 and generates a control signal according to the detected level.

In FIG. 5B, the feedback unit 50 according to a second embodiment is constituted by a digital circuit including an analog to digital converter (ADC) 53, a digital signal processor (DSP) 54 and a digital to analog converter (DAC) 55. The ADC 53, the DSP 54 and the DAC 55 may have the same function as the ADC 21, the DSP 22 and the DAC 23, respectively.

The ADC (second analog to digital converting circuit) 53 converts the third noise cancel signal to a second digital signal. The DSP (second digital filter circuit) 54 digital-filters the converted second digital signal. The DAC (second digital to analog converting circuit) 55 outputs a control signal which is converted from a digital filtered digital data to the analog unit 30.

In FIG. 5C, the feedback unit 50 according to a third embodiment is a hybrid type circuit constituted by an analog circuit of an analog filter 51 and a level detecting circuit 52 and a digital circuit of an analog to digital converter (ADC) 53, a digital signal processor (DSP) 54 and a digital to analog converter (DAC) 55.

Figure 6:
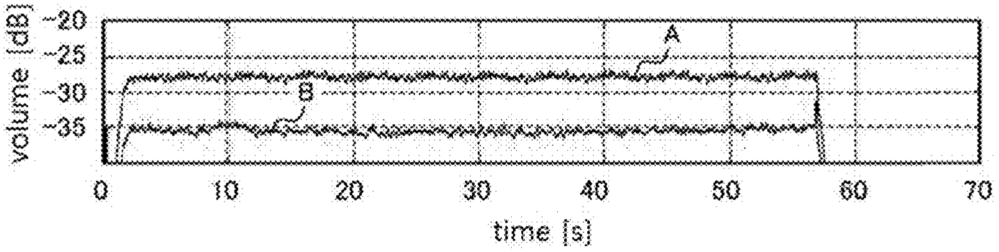
FIG. 6 is a view showing a time dependent property of a noise cancelling system according to the first embodiment of the present disclosure.

FIG. 6 is a view showing a time dependent property of a noise cancelling system according to a first embodiment of the present disclosure.

In FIG. 6, a vertical axis represents a volume, and a horizontal axis represents a time. A waveform A corresponds to the output sound with respect to the time of the noise cancelling system 1 where a function of an active noise control (ANC) is OFF, and a waveform B corresponds to the output sound with respect to the time of the noise cancelling system 1 where a function of an active noise control is ON. A noise cancelling effect of about 7.8 dB is improved due to ON of the function of an ANC.

Figure 7:
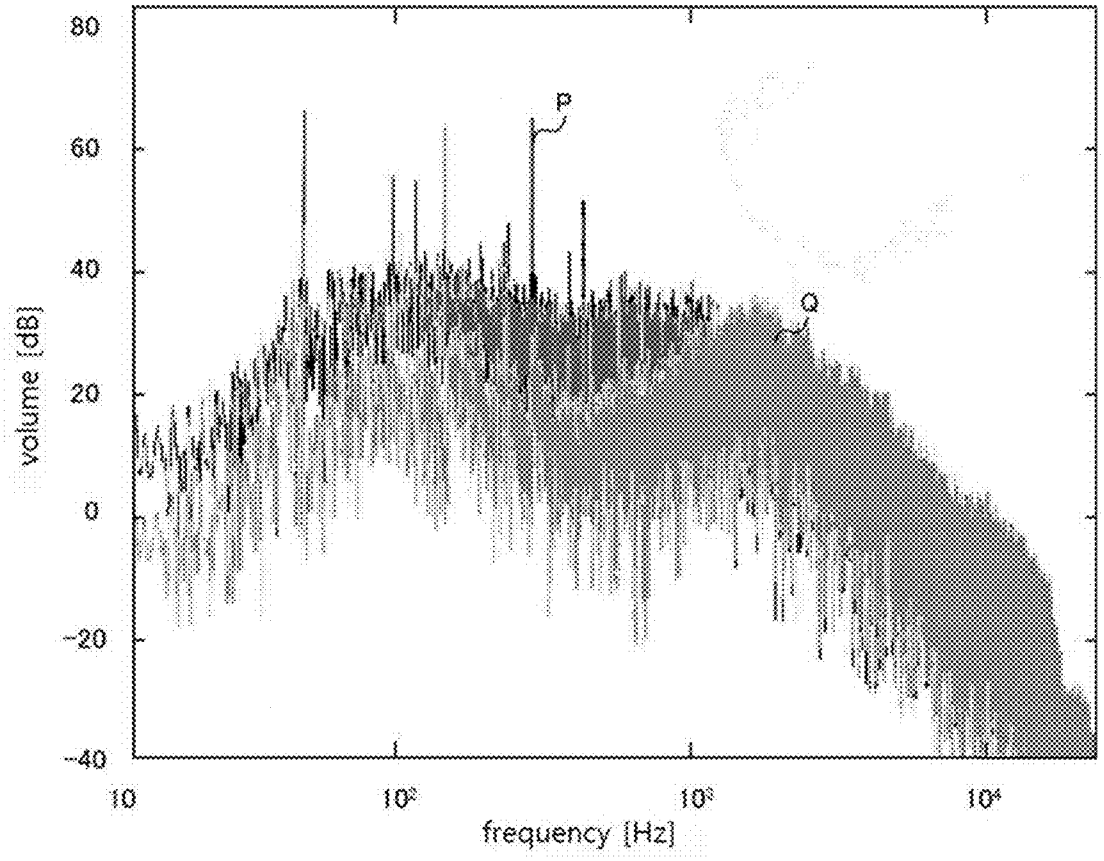
FIG. 7 is a view showing a frequency dependent property of a noise cancelling system according to the first embodiment of the present disclosure.

FIG. 7 is a view showing a frequency dependent property of a noise cancelling system according to a first embodiment of the present disclosure.

In FIG. 7, a vertical axis represents a volume, and a horizontal axis represents a frequency. A waveform P corresponds to the output sound with respect to the frequency of the noise cancelling system 1 where a function of an active noise control (ANC) is OFF, and a waveform Q corresponds to the output sound with respect to the frequency of the noise cancelling system 1 where a function of an active noise control is ON. A noise cancelling effect is improved in a frequency band of about 10 Hz to about 1000 Hz due to ON of the function of an ANC.

In the noise cancelling system 1 according to a first embodiment of the present disclosure, the control signal based on the first noise cancel signal from the digital unit 20 and the second noise cancel signal from the analog unit 30 returns to the analog unit 30 due to the feedback unit 50. As a result, the second noise cancel signal of the analog unit 30 may be dynamically controlled according to a treatment of the digital unit 20. Deterioration of the noise cancelling effect due to the property difference of the digital unit 20 and the analog unit 30 is reduced, and the noise cancelling effect is improved.

Specifically, the analog unit 30 changes the property such as the cutoff frequency, the gain and the phase of the analog filter 31 based on the control signal, and the noise cancelling effect is further improved.

The analog filter 31 includes the resistive element and the capacitive element, and at least one of the resistance value of the resistive element and the capacitance value of the capacitive element is changed according to the control signal. As a result, the property of the analog filter 31 is changed.

Figure 8:
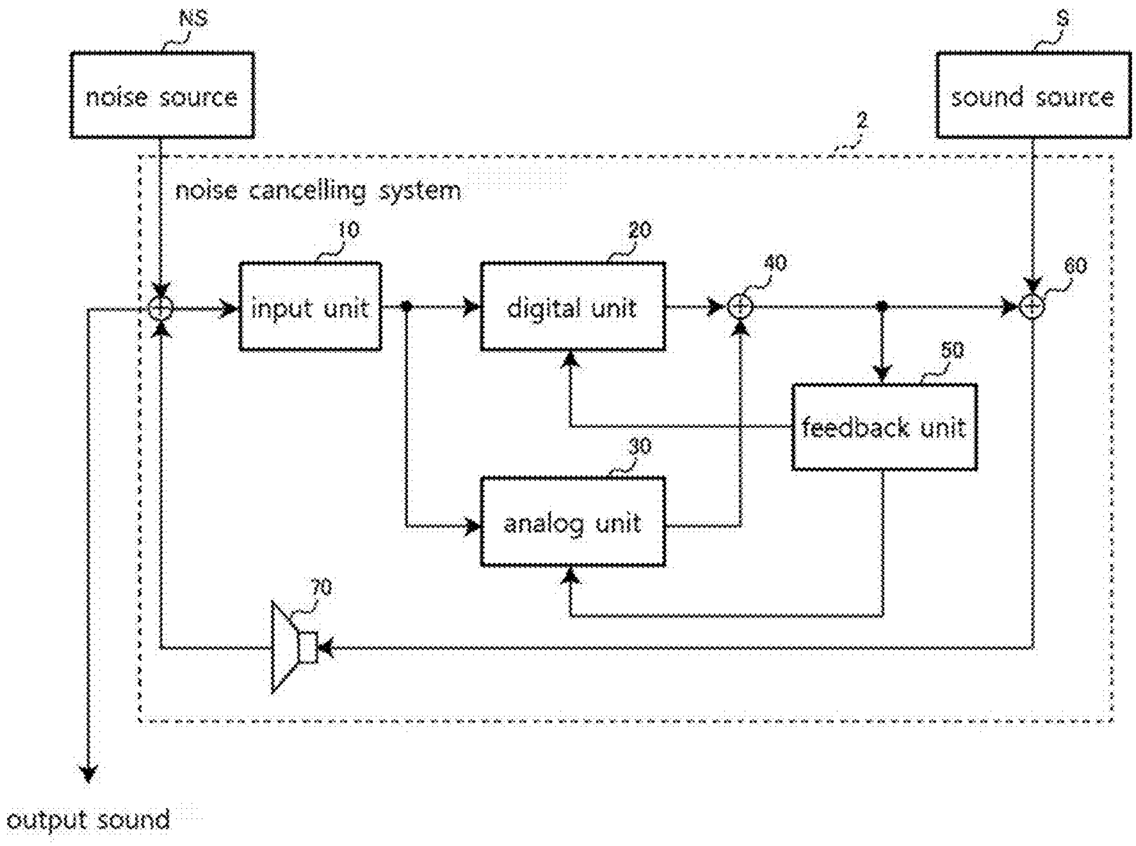
FIG. 8 is a view showing a noise cancelling system according to a fourth embodiment of the present disclosure.

FIG. 8 is a view showing a noise cancelling system according to a fourth embodiment of the present disclosure. Illustration on a part the same as the first embodiment will be omitted.

In FIG. 8, a noise cancelling system 2 according to a fourth embodiment of the present disclosure includes an input unit 10, a digital unit 20, an analog unit 30, a first adder 40, a feedback unit 50, a second adder 60 and an output unit 70. Differently from the first embodiment of FIG. 1, an arrow representing a direction of a control signal outputted from the feedback unit 50 to the digital unit 20 is added. The control signal inputted to the digital unit 20 may be different from the control signal inputted to the analog unit 30.

In the noise cancelling system 2 according to a fourth embodiment of the present disclosure, the feedback unit 50 outputs the control signal based on the first noise cancel signal and the second noise cancel signal to the digital unit 20.

The digital unit 20 may include an adaptive digital filter attenuating a frequency component except for the noise based on the control signal.

Since the digital unit 20 changes the property of the digital filter according to the control signal, deterioration of the noise cancelling effect due to the property difference of the digital unit 20 and the analog unit 30 is reduced. Further, since the digital unit 20 includes the adaptive digital filter attenuating a frequency component except for the noise based on the control signal, the noise cancelling effect is further improved.

In first and second embodiments, the feedback unit 50 generates the control signal based on the third noise cancel signal obtained by adding the first noise cancel signal and the second noise cancel signal. In another embodiment, the control signal may be generated based on a difference between the first noise cancel signal and the second noise cancel signal.

Figure 9:
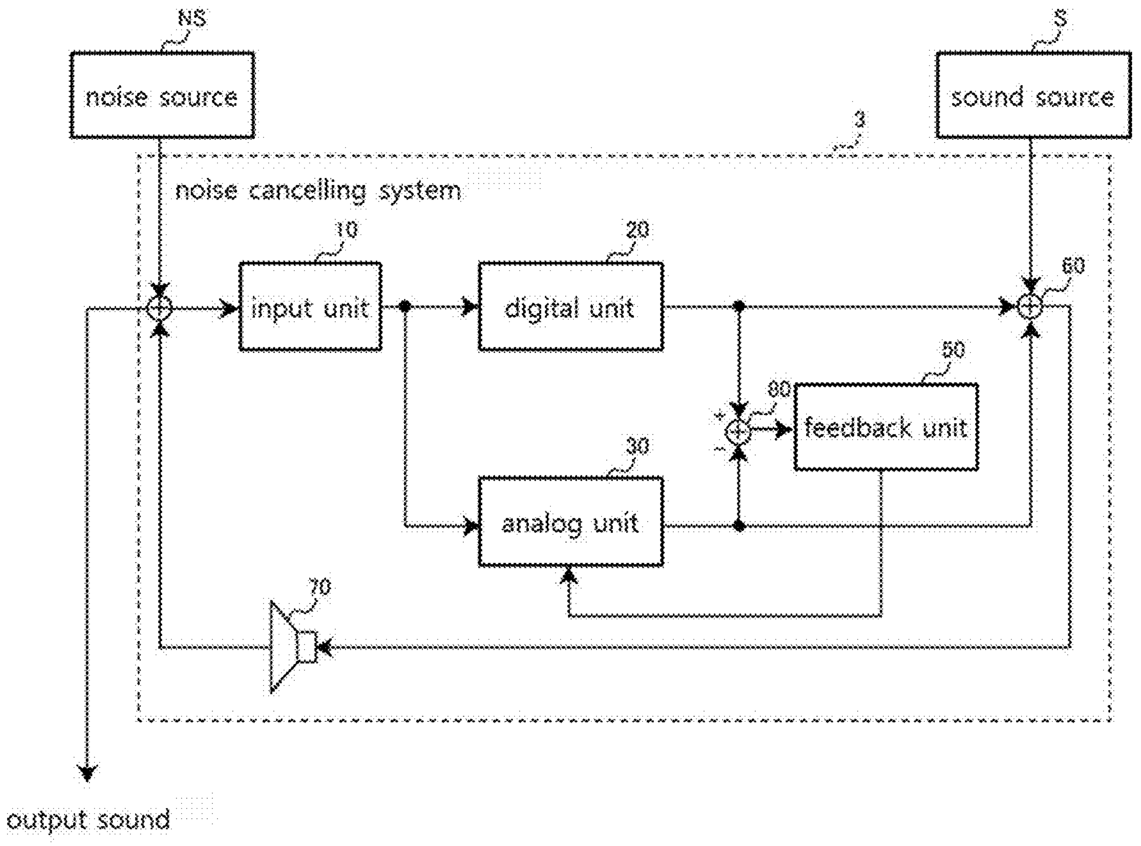
FIG. 9 is a view showing a noise cancelling system according to a fifth embodiment of the present disclosure.

FIG. 9 is a view showing a noise cancelling system according to a fifth embodiment of the present disclosure. Illustration on a part the same as the first embodiment will be omitted.

In FIG. 9, a noise cancelling system 3 according to a fifth embodiment of the present disclosure includes an input unit 10, a digital unit 20, an analog unit 30, a subtractor 80, a feedback unit 50, an adder 60 and an output unit 70. The subtractor 80 outputs a difference between the first noise cancel signal outputted from the digital unit 20 and the second noise cancel signal outputted from the analog unit 30 to the feedback unit 50. The feedback unit 50 performs a filtering and a level detecting to the difference between the first noise cancel signal and the second noise cancel signal and outputs the control signal to the analog unit 30.

In the noise cancelling system 3 according to a fifth embodiment of the present disclosure, the control signal is generated based on the difference between the first noise cancel signal and the second noise cancel signal. Since the analog unit 30 is controlled such that the difference is reduced, a property difference of each of the digital unit 20 and the analog unit 30 is further reduced. As a result, deterioration of the noise cancelling effect due to the property difference of the digital unit 20 and the analog unit 30 is reduced, and the noise cancelling effect is further improved.

In first to third embodiments, the noise cancelling system has the feedback type. In another embodiment, the noise cancelling system may have a feed forward type or a combination of a feed forward type and a feedback type.

Figure 10:
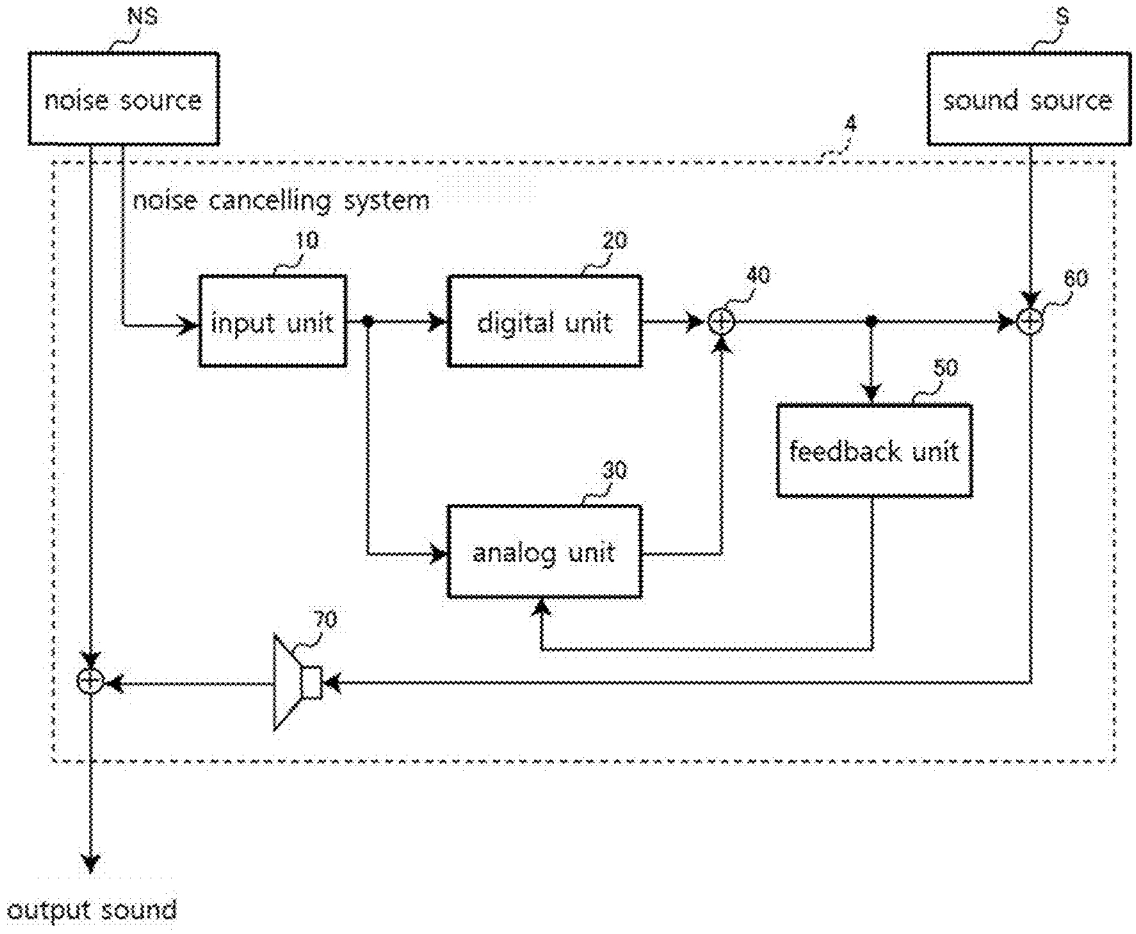
FIG. 10 is a view showing a noise cancelling system according to a sixth embodiment of the present disclosure.

FIG. 10 is a view showing a noise cancelling system according to a sixth embodiment of the present disclosure. Illustration on a part the same as the first embodiment will be omitted.

In FIG. 10, a noise cancelling system 4 of a feed forward type according to a sixth embodiment of the present disclosure includes an input unit 10, a digital unit 20, an analog unit 30, a first adder 40, a feedback unit 50, a second adder 60 and an output unit 70. In the feed forward type, a control input is determined by predicting an operation based on a system model without obtaining a real situation. A microphone of the input unit 10 does not receive a sound outputted from a speaker and receives an external noise. As a result, the external noise is removed in an ear of a user, and the user may receive only the sound without the external noise.

It is to be noted that first and second embodiments of the present disclosure are shown by way of example only, and the present disclosure is not limited thereto. Any one or more elements or features disclosed in the first and second embodiments may be selectively combined to arrive at new embodiments.

It will be apparent to those skilled in the art that various modifications and variation can be made in the present disclosure without departing from the scope of the disclosure. Thus, it is intended that the present disclosure cover the modifications and variations of this disclosure provided they come within the scope of the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A noise cancelling system, comprising:

an input unit that outputs a noise signal corresponding to an external noise;

a digital unit including an analog to digital converting circuit that converts the noise signal into a digital signal, a digital filter circuit that filters the digital signal, and a digital to analog converting circuit that converts the digital signal filtered by the digital filter circuit into a first noise cancel signal of an analog type;

an analog unit that outputs a second noise cancel signal obtained by filtering the noise signal;

an adder that outputs a third noise cancel signal obtained by adding the first noise cancel signal and the second noise cancel signal;

an output unit that outputs an output signal obtained by adding the third noise cancel signal to a sound signal of a sound source; and a feedback unit that outputs a control signal based on the first noise cancel signal and the second noise cancel signal to the analog unit.

2. The noise cancelling system of claim 1, wherein the analog unit includes a first analog filter, and wherein a property of the first analog filter is adjusted based on the control signal.

3. The noise cancelling system of claim 2, wherein the first analog filter includes a resistive element and a capacitive element, and wherein at least one of a resistance value of the resistive element or a capacitance value of the capacitive element is changed according to the control signal.

4. The noise cancelling system of claim 3, wherein the capacitive element includes a variable capacitance diode.

5. The noise cancelling system of claim 3, wherein the resistive element includes a potentiometer.

6. The noise cancelling system of claim 2, wherein the first analog filter includes a low pass filter, and wherein a cutoff frequency of the low pass filter is changed based on the control signal.

7. The noise cancelling system of claim 2, wherein a gain of the first analog filter is changed based on the control signal.

8. The noise cancelling system of claim 2, wherein a phase of the first analog filter is changed based on the control signal.

9. The noise cancelling system of claim 2, wherein the first analog filter includes a Bessel filter.

10. The noise cancelling system of claim 1, wherein the feedback unit comprises:

a second analog filter that filters the third noise cancel signal; and a level detecting circuit that detects a level of a signal outputted from the second analog filter and generates the control signal according to the level.

11. The noise cancelling system of claim 1, wherein the feedback unit comprises:

a second analog to digital converting circuit that converts the third noise cancel signal into a second digital signal;

a second digital filter circuit that filters the second digital signal; and a second digital to analog converting circuit that converts the second digital signal filtered into the control signal.

12. The noise cancelling system of claim 1, wherein the feedback unit generates the control signal by analog filtering and digital filtering the third noise cancel signal.

13. The noise cancelling system of claim 1, wherein the feedback unit outputs the control signal to the digital unit.

14. The noise cancelling system of claim 13, wherein a property of the digital filter circuit is adjusted based on the control signal converted into a digital type.

15. The noise cancelling system of claim 13, wherein the digital unit includes an adaptive digital filter that attenuates a frequency component other than the external noise based on the control signal.

16. The noise cancelling system of claim 1, wherein the control signal is generated based on the third noise cancel signal.

17. The noise cancelling system of claim 1, wherein the control signal is generated based on a difference between the first noise cancel signal and the second noise cancel signal.

18. The noise cancelling system of claim 1, wherein the output unit includes a speaker driven according to the output signal, and wherein a microphone of the input unit receives a sound outputted from the speaker and the external noise.

19. The noise cancelling system of claim 1, wherein the output unit includes a speaker driven according to the output signal, and wherein a microphone of the input unit does not receive a sound outputted from the speaker and receives the external noise.

20. A method of driving a noise cancelling system including an input unit that outputs a noise signal corresponding to an external noise, a digital unit including an analog to digital converting circuit that converts the noise signal into a digital signal, a digital filter circuit that filters the digital signal, and a digital to analog converting circuit that converts the digital signal filtered by the digital filter circuit into a first noise cancel signal of an analog type, and an analog unit that outputs a second noise cancel signal obtained by filtering the noise signal, the method comprising:

outputting a third noise cancel signal obtained by adding the first noise cancel signal and the second noise cancel signal;

outputting an output signal obtained by adding the third noise cancel signal to a sound signal of a sound source; and outputting a control signal based on the first noise cancel signal and the second noise cancel signal to the analog unit.

* * * * *